United States Patent [19]

Baird

[11] Patent Number: 5,796,410

[45] Date of Patent: Aug. 18, 1998

[54] GENERATION AND USE OF DEFECTIVE IMAGES IN IMAGE ANALYSIS

[75] Inventor: Henry Spalding Baird, Maplewood, N.J.

[73] Assignee: Lucent Technologies Inc., Murray Hill, N.J.

[21] Appl. No.: 536,910

[22] Filed: Jun. 12, 1990

[51] Int. Cl.$^6$ .................................................. G06T 1/00
[52] U.S. Cl. ...................... 345/471; 382/161; 382/215; 382/216; 345/472
[58] Field of Search ........................... 395/151, 150; 382/14, 15, 29, 50, 61, 49, 38, 27, 21, 37, 33, 77, 40, 36, 34, 54, 161, 215, 216; 345/471, 472

[56] References Cited

U.S. PATENT DOCUMENTS

| | | | |
|---|---|---|---|
| 3,634,822 | 1/1972 | Chow | 382/34 |
| 3,706,071 | 12/1972 | Gray | 382/34 |
| 4,599,693 | 7/1986 | Denenberg | 395/77 |
| 4,658,429 | 4/1987 | Orita et al. | 382/36 |
| 4,850,026 | 7/1989 | Jeng et al. | 382/21 |
| 4,876,731 | 10/1989 | Loris et al. | 382/40 |
| 4,944,022 | 7/1990 | Yasujimu et al. | 382/14 |
| 5,010,504 | 4/1991 | Lee et al. | 364/574 |
| 5,048,100 | 9/1991 | Kuperstein | 382/36 |
| 5,052,043 | 9/1991 | Gaborski | 382/14 |
| 5,054,093 | 10/1991 | Cooper et al. | 382/14 |
| 5,058,180 | 10/1991 | Khan | 382/14 |
| 5,067,166 | 11/1991 | Ito | 382/37 |
| 5,077,807 | 12/1991 | Bokser | 382/14 |
| 5,077,809 | 12/1991 | Ghazizadeh | 382/33 |

OTHER PUBLICATIONS

Baird, Henry S.: "Feature Identification for Hybrid Structural/Statistical Pattern Classification"; *Computer Vision, Graphics, and Image Processing*; vol. 42 #3; Jun., 1988; pp. 318–333.

C. Leung, et al., "A Distortion Model for Chinese Character Generation", IEEE 1985 Proceedings of the Int'l Conf. on Cybernetics and Society, Tucson, AZ, Nov. 12–15, 1985, IEEE, New York, US, pp. 38–41.

K. Ishii, "Generation of Distorted Characters and its Applications" 8169 Systems–Computers–Controls, 14(1983) Nov.–Dec., No. 6, Silver Springs, MD, USA.

*Primary Examiner*—Joseph H. Feild
*Attorney, Agent, or Firm*—Gordon E. Nelson

[57] ABSTRACT

Apparatus and methods for generating a set of defective images from a model image. Defect parameters used with the apparatus and methods specify classes of defects including resolution, blur, threshold, speckle, jitter, skew, distortion of width and height, offset from a baseline, and kerning. The parameters further permit specification of a range of sizes of the defects and a distribution of the defects within the range. Within the apparatus, actual values for the defects are generated randomly within the specified ranges and distributions. The model image may be represented by means of pixels or by a format which describes the model image's shape. The user may specify the number and the size of the defective images. The defective images are useful for inferring accurate and efficient image classifiers for use in image recognition devices such as optical character readers.

34 Claims, 9 Drawing Sheets

GENERATION AND USE OF DEFECTIVE IMAGES IN IMAGE ANALYSIS

BACKGROUND OF THE INVENTION

1. Field of the Invention

A problem of increasing importance in computer technology is the extraction of information from images which are represented as arrays of pixels (picture element intensity values). On the one hand, computer technology has successfully automated the acquisition, storage, and transmission of images of documents; on the other hand, it has even more successfully automated the storage and manipulation of information represented by strings of digital codes representing text characters.

What has been much less successfully automated is the conversion of character information in images into character-string data. Often, the same technique is used as was used to convert character information on pieces of paper into character-string data: a data entry clerk reads the image and uses a keyboard to enter character-string data equivalent to the information on the image into a data base. The difficulties with this procedure are obvious: it is expensive, slow, and error-prone.

The key to the problem of converting character information into character-string data is the automated recognition of portions of images as symbols such as letters or numbers. Devices which perform such recognition are termed image classifiers in the art. Image classifiers are generally implemented as programs which run on a computer system and analyze a digital representation of the image which is stored in the computer system's memory.

One source of difficulty in the design of image classifiers has been dealing with defective pixel representations of the symbols. If the image classifier is to successfully recognize portions of images which may be symbols, it must not only be able to recognize those portions of the image which are good representations of the symbols, but also those which are defective representations. The defects can have a number of sources. For instance, the paper document which was the source of the image may be defective: it may have spots of dirt, it may have been folded, or it may have been made by a defective printing device. Further, when the paper document was scanned, it might not have been properly placed in the scanner, with the result that the image is distorted. The optics of the scanning process may produce additional defects, and there are finally the defects which are inherent in the representation of the continuous features of the document by means of an array of pixels.

In the image analysis art, the process of modifying an image classifier so that it successfully handles defective representations of symbols is termed training the image classifier. Training may be manual or automatic; in the manual case, the image classifier is operated on images with defective symbols and the classifier's algorithms are modified until it works with the defective symbols. In automatic training, artificial intelligence or neural network techniques are used which permit the image classifier to respond to defective images by modifying itself so that it properly analyzes them.

2. Description of the Prior Art

As is clear from the foregoing, proper training requires that the image classifier be tested with, or in the case of automatic training, exposed to, a set of defective symbols which includes virtually the entire range of defects which the images to be classified by the image classifier may contain. In the prior art, such sets of defective symbols have been collected manually, and the provision of an adequately large set of defective symbols has proved in practice to be impossible. What is needed, and what is provided by the present invention, is a technique which permits automatic generation of sets of defective symbols.

SUMMARY OF THE INVENTION

Disclosed herein is a method for generating examples of defective images having the following steps:

receiving a set of one or more defect parameters, each defect parameter in the set specifying a class of image defects;

receiving a set of one or more model images; and employing a defective image maker responsive to the defect parameters to generate a set of defective images including image defects belonging to the classes specified by the defect parameters from the set of model images.

Also disclosed is apparatus for performing the above method. Further aspects of the technique include specification of a range of defects and specification of a distribution of defects in the range in the defect parameters and specification of the number of defective images to be produced from a given model image and the range of sizes of the defective image. Defects for which it has proved useful to provide defect parameters include resolution, blur, threshold, speckle, jitter, skew, distortions of width and height, defective position relative to a baseline, and kerning. The model images may have either representations which describe the shape of the model images or pixel representations. The defective images generated using the disclosed method and apparatus may be employed to infer classifiers used in image recognition systems.

It is thus an object of the invention to provide an improved image recognition system;

It is another object of the invention to provide a method and apparatus for generating sets of defective inventions;

It is a further object of the invention to provide a method and apparatus for generating images with defects specified by defect parameters; and It is an additional object of the invention to provide a method and apparatus for generating images with defects having ranges and distributions specified by the defect paramenters.

These and other objects and advantages of the invention will be apparent to those of ordinary skill in the art to which the invention pertains after consideration of the following Detailed Description and Drawing, wherein:

BRIEF DESCRIPTION OF THE DRAWING

FIG. 1 shows examples of defect classes;

FIG. 2 shows further examples of defect classes;

Figure 3:
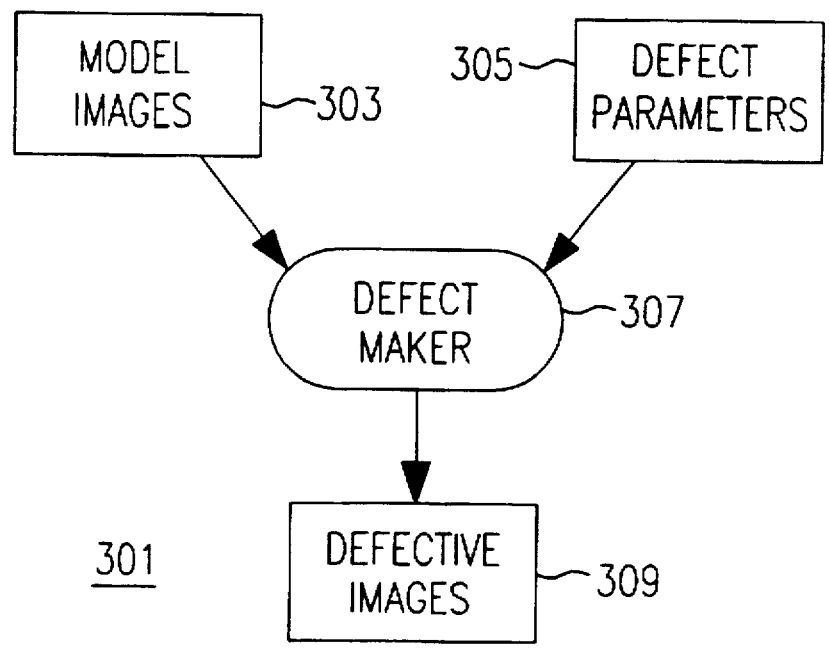
FIG. 3 is a block diagram of an image defect generator 301.

Reference numbers in the figures have two parts: the rightmost two digits specify an element number within a figure; the remaining digits specify the figure in which the element specified by the reference number first appears. Thus, element 801 is first shown in FIG. 8.

DETAILED DESCRIPTION

The following Detailed Description of the techniques for generating examples of defective characters and the applications of those techniques which are the subject matter of the present application will begin with a description of the classes of defects for which parameters are provided in a preferred embodiment, will then continue with a detailed description of the techniques, and will conclude with a discussion of some applications of the techniques.

Classes of Local Imaging Defects: FIGS. 1 and 2

In a preferred embodiment, the examples of defective characters may include defects belonging to one or more of 10 classes of defects. FIGS. 1 and 2 show the 10 classes 101 and give examples of the defects over a range of parameter values. In the following discussion, the name of each defect is followed by the reference number of the example.

Resolution 103

The degraded image will be spatially-quantized. In practice, this is the result of both the absolute size of the symbol and the scanning digitizing resolution, specified separately as size (in points), and resolution (in pixels/inch). For experiments in character recognition the distribution of sizes is uniform on [5,14] point, at a resolution of 300 pixels/inch (roughly equivalent here to the range [10,30] pixels/character-height). Reference number 103 shows examples from 5 to 11 point, scaled to the same absolute size for clarity.

Blur 105

The point-spread (or, impulse response) function of the combined printing-and-imaging process is modeled as a circularly-symmetric Gaussian filter with a standard error of blur in units of output pixel size. Note that blur 0.7 implies effectively zero cross-talk between non-8-connected pixels: thus 0.7 may be close to the optimal hardware design for bi-level scanners. In a preferred embodiment, blur is distributed normally with mean m=0.7 and standard error e=0.3. The images at 105 illustrate the effects of blur parameter values {m–3e, m–2e, m–e, m, m+e, m+2e, m+3e }, which will be explained in detail later. (this set of parameters is also used in illustrations below, unless noted).

Threshold 107

Binarization is modeled as a test on each pixel: if its intensity≧threshold, the pixel is black. A threshold of 0.25 guarantees that a stroke that is one output-pixel wide will not be broken under the mean blur of 0.7. In a preferred embodiment, threshold is normally set to mean 0.25 and standard error 0.04. On coarsely-quantized input, other choices are appropriate.

Speckle 109

Speckle models variations in the sensitivity of the photoreceptors used to capture the original image. Each pixel's photoreceptor sensitivity is randomized in two stages: for each char, speckle is selected, in units of intensity ∈[0,1]; then, for each pixel, a sensitivity adjustment is chosen randomly, distributed normally with mean 0 and standard error speckle, and added to each pixel's intensity. For experiments in character recognition speckle may vary from image to image, normally with mean 0.125 and standard error 0.04.

Jitter 111

Jitter models variations in the locations of the photoreceptors used to capture the original image from a square grid. Slight variations are permitted in the model, again in two stages: for each symbol, jitter is specified, in units of output pixel size; then, for each pixel in the symbol, a vector offset (x,y) is chosen (each component independently) from the normal distribution having mean 0 and standard error jitter. Since it is clearly unlikely that two pixel centers will touch, jitter may vary, from image to image, normally with mean 0.2 and standard error 0.1. The effects are often subtle.

Skew 113

The symbol may rotate (about a given fiducial point) by a skew angle (in degrees). Experiments on over 1000 pages of books, magazines, and letters, placed on a flatbed document scanner by hand with ordinary care, have shown a distribution of angles that is approximately normal with a mean 0 and a standard error 0.7. The actual distribution is somewhat long-tailed: absolute skew angles greater than 2 degrees occur more often than in a true Gaussian. For experiments in character recognition a distribution with twice this standard error is useful.

Width 201

Width variations are modeled by a multiplicative parameter x-scale, that stretches the image horizontally about the symbol's center. Measurements on low-quality images, such as produced by FAX machines, suggest that this is approximately normal with mean 1.0 and standard error 0.05. However, a distribution uniform in the interval [0.85,1.15], is useful for experiments in character recognition. Such a range permits modeling a range of font deformations (the "condensed" and "expanded" font varieties). Reference 201 shows samples placed uniformly across the range.

Height 203

Height variations are modeled by a multiplicative parameter y-scale, that stretches the image vertically about the baseline. Measurements on low-quality images, such as produced by FAX machines, suggest that this is approximately normal with mean 1.0 and standard error 0.05.

Baseline 205

In machine-printed text, the height of a symbol above the conventional baseline (or, in some writing systems, below a top-line) is often significant: this baseline parameter is in units of ems. In measurements on over 120,000 characters from letterpress books (printed somewhat more erratically than is usual), a long-tailed normal distribution was again observed, with a mean 0 and a standard error 0.03. For experiments in character recognition a distribution with twice this standard error is useful.

Kerning 207

The parameter kern varies the horizontal placement of the image with respect to the output pixel grid. Of course, in most writing systems the horizontal position is irrelevant for segmented symbol recognition. The motivation is to avoid systematic digitizing artifacts. This is easily accomplished by letting it vary uniformly in [–0.5,0.5], in units of output pixel size; Reference 207 shows examples spaced uniformly across the range. The effects are often subtle.

Overview of the Defective Image Generator: FIG. 3

In a preferred embodiment, images having the defects listed in the preceding section are generated by means of the image defect generator shown in FIG. 3. Image defect generator 301 has four components: model images 303, defect parameters 305, defect maker 307, and defective images 309. Beginning with model images 303, the model images are one or more images which serve as models of good images. The model images may be represented by means of a variety of techniques, including pixel representations or representations by means of geometric descriptions of edges of the images. Defect parameters 305 specify the defects which are supposed to be included in the images generated by generator 301. In a preferred embodiment, defect parameters 305 further specify a range of size of the defect and a distribution for a randomized set of defects within the specified range. In a preferred embodiment, the defect parameters specify the defects listed in the preceding section; however, in some applications, fewer than all of the defects listed in the preceding section may be useful, and in others, defects different from those listed may be useful. Defect maker 307 takes model images 303 and produces defective images 309 from them which have the defects specified by defect parameters 305.

In a preferred embodiment, defect maker 307 is a program executing on a processor in a digital data processing system. Model images 303 are stored in files in the digital data processing system and defect parameters 305 are provided via a command line when defect maker 307 is executed. Defective images 309 are output to files in the digital data processing system. In other embodiments, the parameters may be provided by means of a file, menu, screen, or the like, and defective images 309 may be directly output to a display device or to apparatus for inferring a classifier.

Implementation of Defect Maker 307, FIGS. 4–8

In a preferred embodiment, defect maker 307 is executed in a computer system running the well-known UNIX® operating system. The command line used to execute defect maker 307 specifies an input file which contains one or more model images 303, an output file which is to receive defective images 309, and defect parameters 305. Defect parameters 305 appear in the command line as command line options. The following discussion of defect maker 307 will first describe the input file, then the output file, then the relevant command line options, and will finally describe the operation of the program.

Figure 5:
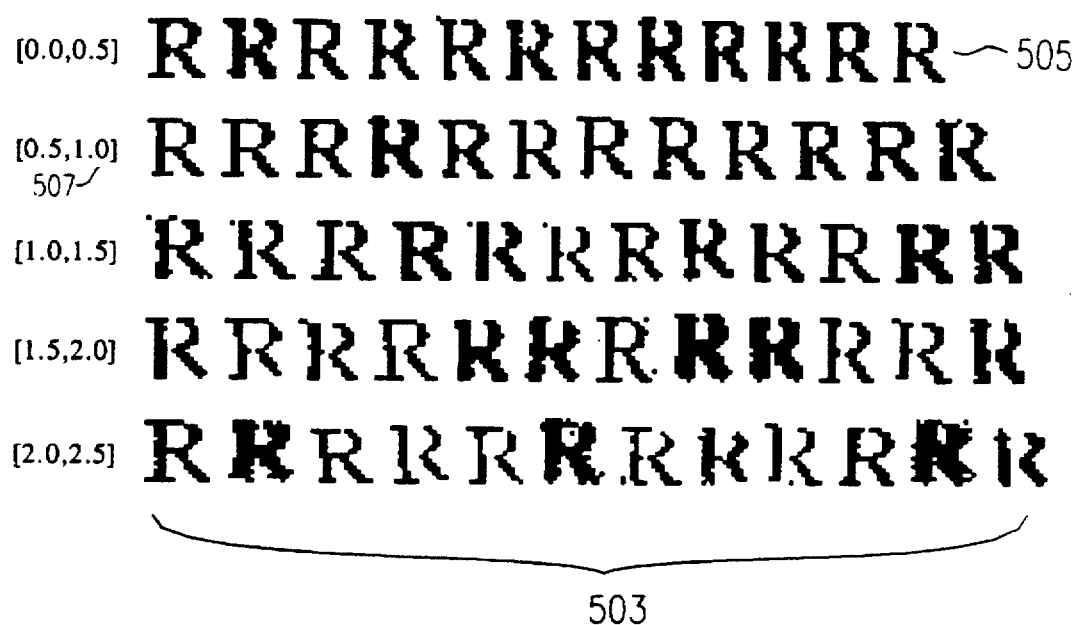
FIG. 5 shows examples of the defective images output by image defect generator 301.

Inputs and Outputs: FIG. 5

Defect maker 307 in a preferred embodiment operates on two different kinds of model images. One kind is a single model image which is specified in the input file by means of a bec format. This type of format, which is well known in the art, is used by makers of computer typesetters to represent characters. The format employs ASCII characters to specify three types of information about the character:

the character's outline;
 its size in points; and
 the resolution in pixels per inch of the image to be made from the bec format.

The other kind of model image is one or more representations in pixels of images for which defective images are to be represented. Which variety of model image is being used is specified by means of an option in the command line. Model images in the bec format are useful for character recognition research and for training classifiers to deal with documents employing the conventions of typesetting. Model pixel images are useful for training classifiers to deal with documents employing symbols for which bec representations are not available.

For a given model image, defect maker 309 may produce the following sets of output images:

a single output image with the kinds and sizes of defects specified by defect parameters 305;
 a set of output images with the kinds of defects specified by defect parameters 305 and sizes of defects which are randomized within a range and with a distribution specified by defect parameters 305; and either of the above in a range of point sizes.

Again the kind of output is specified by options in the command line when defect maker 307 is invoked. The sets of output images are formatted as lines of images on a page. FIG. 5 shows format 501 of the output. In this case, the model image was a 5-point upper-case R specified in bec format. Each line 503 shows a set of defective images 505 with a different range of defect sizes. The range of defect sizes for each line 503 is expressed by a range of Mahalanobis distances 507. The Mahalanobis distance is a statistical measure expressing the Euclidean distance from the mean, scaled component-wise by standard error.

Defect parameters 305 are defined by means of options in the command line. The options are the following:

The following options specify distributions for pseudorandom variables 'v'. Each has two numeric options 'm' and 'e': the random variable 'v' lies in the range |m−e ,m+e| with a distribution specified as follows:

e>0 v is normally distributed with mean=m & standard error=e/3 e<0 v is uniformly distributed e==0 v=m (constant)

If either mean or err is omitted, the default is used (see below).

−am.e SKEW ANGLE: rotation (degrees) (default: −a0, 4.0; that is, Gaussian with stderr 1.33, which is 2× worse than the 0.66 seen in a sample of 1898 columns read from the Informator).

−bm.e BASELINE: height above (Ems) (default: −b0, 0.18; that is, Gaussian with stderr 0.06, which is 2× worse than the 0.03 seen in a sample of 120.054 characters read from the Informator).

−em.e BLURRING: (point-spread) function is a circularly-symmetric Gaussian filter with a standard__ error of v in units of output pixel-height (i.e. at resolution 'R'), truncated to zero where it falls below 0.1 of maximum. Its radius is thus 2.12*v. (default: −e.7,0.9; v=0.7 implies radius=1.5 and therefore zero cross-talk between non-8-connected pixels: this may be close to the optimal hardware design.

−jm.e JITTER: each pixel's photo-receptor location is randomized in two stages: for each char, 'v' is selected as specified by −jm.e; then, for each pixel in that char, a vector offset (x,y) is chosen (each component independently) from the Gaussian distribution having mean=0 and stderr=v . In units of output pixel-height. (default: −j.2,0.3)

−km.e KERNING: horizontal shift (pixels) (default: −k0, −0.5) This varies the horizontal placement of the image with respect to the underlying pixel grid, uniformly. In units of output pixel-width.

−sm.e SPECKLE: each pixel's photo-receptor sensitivity is randomized in two stages: for each char, 'v' is selected as specified by −sm.e; then, for each pixel, a sensitivity adjustment is chosen randomly, distributed normally with mean=0.0 and stderr=v/3. The adjustment is added to each pixel's brightness before the threshold test (see −t). (default: −s0.125,0.125)

−tm.e THRESHOLD: in |0,1|: a pixel is black iff its darkness value>thresh (see effects of −s) (default: −t.25,0.125; 0.25 is halfway between the expected intensities at: (a) a black pixel just off center of a 1-pixel-wide line, and (b) the white pixel next to it, assuming that −e.7, and thus the lowest threshold ensuring the line will not be broken.)

-xm,e X-SCALING: (width adjustment) (default: -x1,-0.15)

-ym,e Y-SCALING: (height adjustment) (default: -y1, 0.05)

Operation of Defect Maker 307: FIGS. 4, 6–8

Operation of defect maker 307 is shown by means of the flowcharts in FIG. 4 and FIGS. 6–8. Each succeeding flowchart shows a component of the preceding flowchart in greater detail. Beginning with FIG. 4, which shows top-level flowchart 401, the first step in execution of defect maker 307 is reading the command line, as shown in box 403. Reading the command line of course includes reading the options specifying defect parameters 305 and the names of the input and output files. The values specified in the command line are saved in variables for later use. The next step, at box 405, is to open the input file containing model images 303 and the output file which is to contain defective images 309. Then, at box 407, the format of the page which is to contain defective images 309 is set up.

Next comes loop 425, which is controlled by decision diamond 409. As indicated above, among the things which may be specified by command line options is a range of font sizes for the defective images 309. The range is specified in the command line by means of a list of font sizes; loop 425 is executed once for each font size; if no list is specified, the default font size is 8 point. Once defective images have been generated for all font sizes on the list, the program terminates, as indicated by end box 411. Within loop 425, the kind of processing is determined by the format of model image 303. As indicated by decision diamond 413, when model image 303 is in bec format, the bec representation of the image is processed at 415; otherwise, as indicated by loop 423 and decision diamond 417, for each model image in the input file, the pixel image is converted to bec format by means of techniques well-known in the art and the bec representation is processed at box 421 in the same fashion as at box 415.

Figure 4:
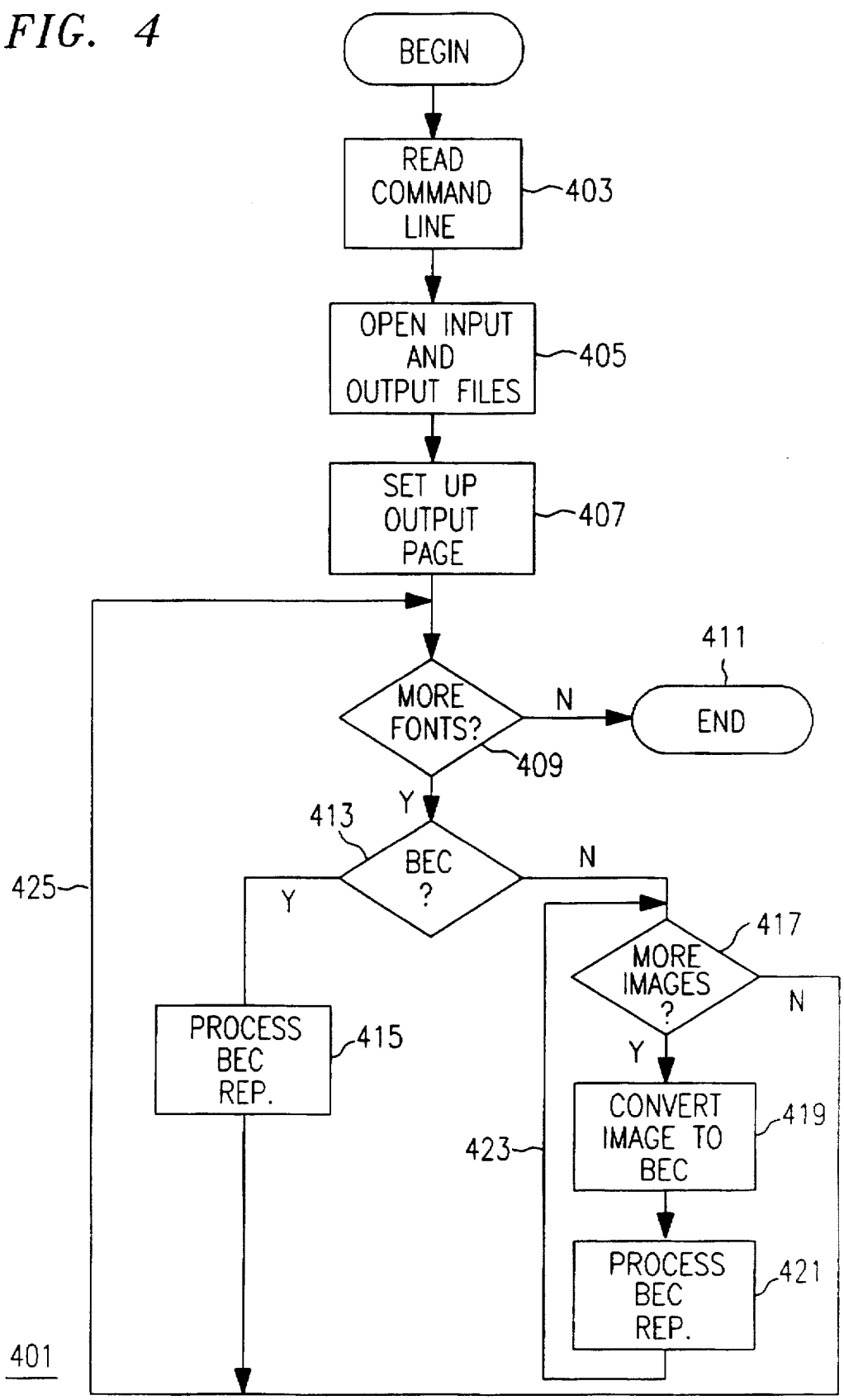
FIG. 4 is a high-level flowchart of the operation of defect maker 307.
Figure 6:
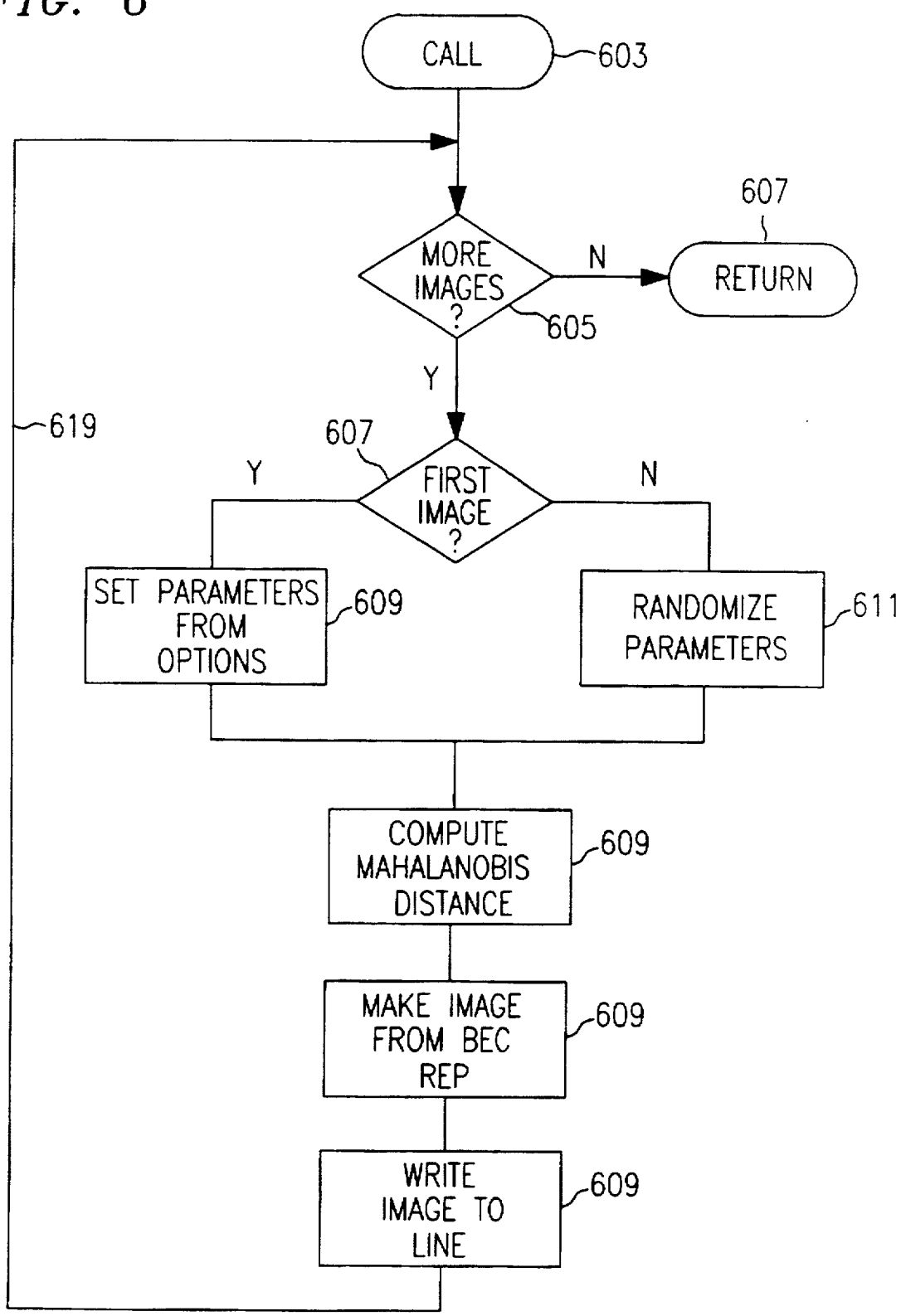
FIG. 6 is a detailed flowchart of block 415 or 421 of the flowchart of FIG. 4

Continuing with FIG. 6, the flowchart of that FIG. shows the processing of the bec representation of box 415 or box 421 of FIG. 4 in detail. As indicated above, one of the command line options permits the user to specify the number of defective images 309 to be created for each point size. The default is 1. Accordingly, flowchart 601 consists of loop 619, which is executed until the number of images specified in the command line option have been made. The loop is controlled by diamond 605, and when the number of images has been made, control returns to flowchart 401, as shown by return box 607.

Within the loop, processing depends on whether it is the first or a subsequent execution of the loop. On the first execution, as shown by decision diamond 607 and box 609, the sizes of the defects used to make defective image 309 are simply set from the sizes specified in the input parameters, without regard to error range or distribution. On subsequent executions, the sizes are set from randomized values which are within the range and have the distribution specified in the input parameters. In a preferred embodiment, randomization is by means of the UNIX® frand function, with the seed for frand being computed using a command line argument.

The next step is shown in box 613. It is the computation of Mahalanobis distance for the defect parameters which will be used to make the defective image. The C language code for the computation follows. In the code, variables beginning with me__indicate the defect sizes specified in the command line; those beginning with er__specify the ranges specified in the command line; those beginning with rp→ specify the parameters which will actually be used in the computation (henceforth termed actual parameters). On the first time through loop 619, these are set from the command line parameters; on the other times, they are set to the randomized values computed in step 611. Here is the code:

/* compute Mahalanobis distance from mean parameter vector */ da=(er__skew==0.0)? 0.0: (3*abs(rp-→skew-me__skew)/ er__skew);

db=(er__bhgt==0.0)? 0.0: (3*abs(rp-→bhgt-me__bhgt)/ er__bhgt);

de=(er__blur__er==0.0)? 0.0: (3*abs(rp-→blur-me__ blur__er)/er__blur__er);

dj=(er__jitt__er==0.0)? 0.0: (3*abs(rp-→jitter-me__jitt$_{er}$)/ er__jitt__er);

dk=(er__kern==0.0)? 0.0: (3*abs(rp-→kern-me__kern)/ er__kern);

ds=(er__sens__er==0.0)? 0.0: (3*abs(rp-→speckle-me__ sens__er)/er__sens__er);

dt=(er__thrs==0.0)? 0.0: (3*abs(rp-→thresh-me__thrs)/ er__thrs);

dx=(er__xscl==0.0)? 0.0: (3*abs(rp-→xscale-me__xscl)/ er__xscl);

dy=(er__yscl==0.0)? 0.0: (3*abs(rp-→yscale-me__yscl)/ er__yscl);

Mdist=sqrt((sqr(da) /*+sqr(db)*/+sqr(de) /*+sqr(dj)+sqr (dk)*/+sqr(ds) +sqr(dt)+sqr(dx)+sqr(dy))/6.0/*9.0*/);

The next step after computing the Mahalanobis distance in box 613 is making the defective image from the bec representation in box 615; this step will be discussed in more detail below. The last step in the loop is writing the defective image to the current line of the output file. A further detail which is not shown in FIG. 6 is that a command line option permits the user to specify a range of Mahalanobis distances. If the Mahalanobis distance computed in step 613 is not within the range, loop 619 continues without execution of steps 615 and 617.

Figure 7:
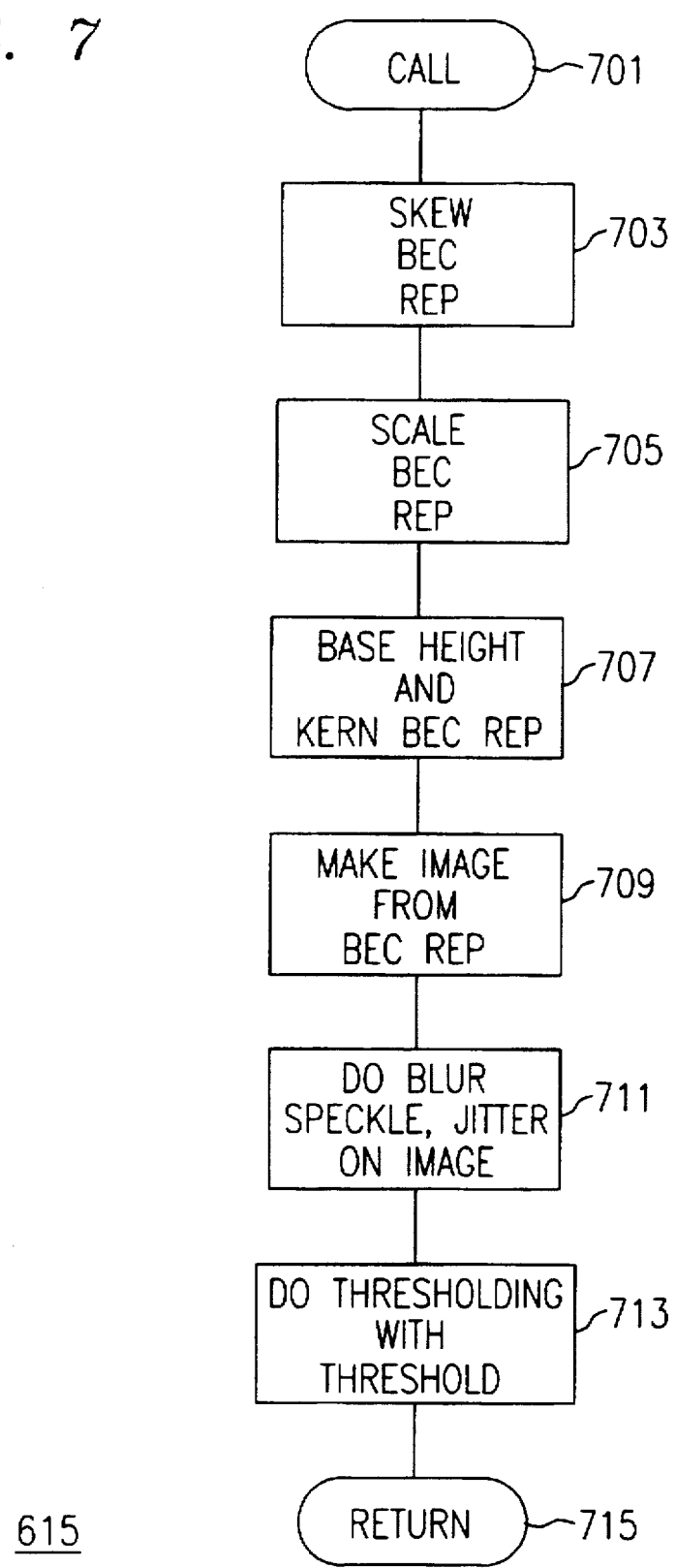
FIG. 7 is a detailed flowchart of block 615 of the flowchart of FIG. 6.

Turning to FIG. 7, that figure shows box 615 of FIG. 7 in greater detail. The bec representation being processed is turned into a defective image as follows: first, the bec representation is rotated about its center by the amount specified in the actual skew paramenter value, as shown in step 703. Next, the bec representation is scaled as specified by the actual x and y scale parameters (box 705). Next, the bec representation is translated up or down as specified by the actual base height parameter and left or right as specified by the actual kern parameter, as shown at box 707. The foregoing operations are performed on the bec representation instead of the image generated therefrom in order to increase performance.

The next step (box 709) is to make a pixel representation of the image from the bec representation as altered by the actual skew, scale, base height, and kern parameters. The pixel representation is an array of pixels representing points in the image. Each pixel has a real number value. In the image made from the bec representation, those pixels representing parts of the image which are black have the value 1.0; those representing parts which are white have the value 0.0. There are no shades of gray in the image. Then, as shown in box 711, the image produced in step 709 is modified as specified by the actual blur, speckle, and jitter parameters. This modification will be explained in more detail below. The image resulting from the modification is a gray scale image, i.e., the pixels may have any value in the range [0.0,1.0]. A thresholding function converts the gray scale image into a black and white image, as shown at 713.

One of the values supplied to the thresholding function is the thresholding defect parameter, and the function does the thresholding in accordance with the defect parameter. While some of the defect parameters in the present embodiment are applied to the bec representation of the image, and others to the pixel representation, in other embodiments, any or all of the parameters may be applied to either representation.

Figure 8:
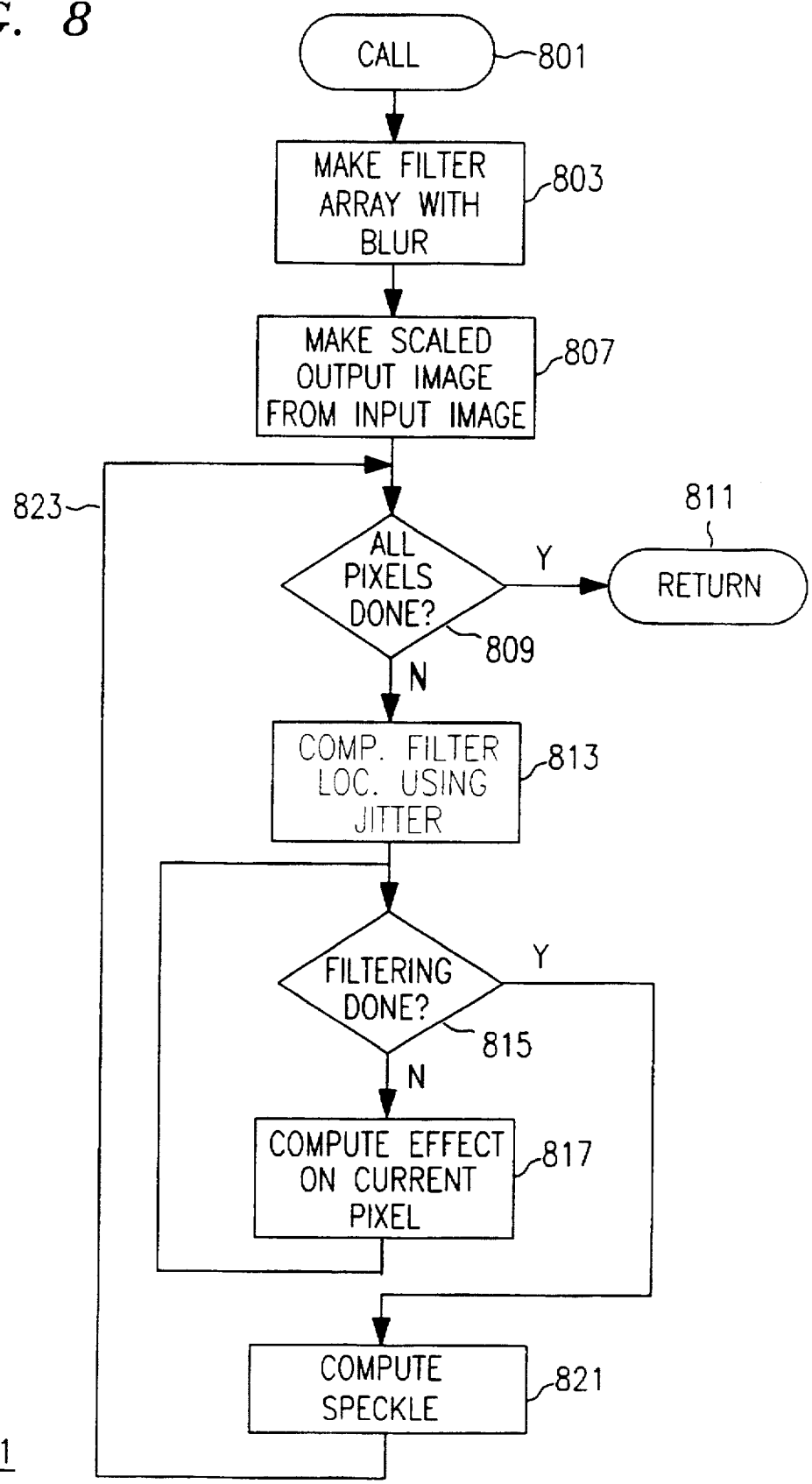
FIG. 8 is a detailed flowchart of block 711 of the flowchart of FIG. 7.

FIG. 8, finally, shows step 711 of FIG. 7 in greater detail. The blur defect parameter is concerned with image defects resulting from the fact that the sensors used to digitize images are affected not only by the value of a given point in the image, but also by the values of surrounding points. The degree to which one of the surrounding points affects the sensor is of course a function of the resolution of the sensor and the distance of the surrounding point from the given point. In a preferred embodiment, the effect of the surrounding points is modeled as a circularly-symmetric Gaussian filter centered on the pixel representing the given point. In the implementation, effects below a certain level are ignored, and consequently, the filter deals with points within a given radius of the given point. The blur actual parameter is used to compute both the radius and the degree to which the effects decrease with distance from the given point.

Continuing with the flow chart of FIG. 8, the first step, shown in box 803, is to make the Gaussian filter. In the preferred embodiment, this is done by making a pixel array which is the same size as the output image. The actual blur parameter is used to compute the radius of the Gaussian filter, and the center of the radius is placed at the center of the filter pixel array. For each point within the radius, a floating point value specifying the amount of effect which that point has on the point at the center is computed using the blur parameter and the pixel is set to that value.

Next, the image made from the bec representation in step 709 is scaled as required for the size of the defective image which the defect maker will output (box 807). Next comes loop 823, in which the Gaussian filter pixel array is applied to every pixel in the scaled image, as shown by decision diamond 809. When that is done, the scaled image, which is now a gray scale image instead of a black and white image, is returned to be operated on by step 713 of FIG. 7.

Within loop 823, the following steps are performed for each pixel of the scaled image: first, as shown in box 813, the actual jitter parameter is again randomized and used to compute the x and y coordinates of the center of the Gaussian filter from the x and y coordinates of the current pixel. This simulates the effect of the fact that the receptors which record the image are not actually located at the center points of the grid which the pixel representation models.

The next step is to apply the Gaussian filter pixel array to the pixel of the scaled image currently being processed by loop 823. This is done via another loop 819, in which, for each point within the radius of the filter, the effect of that point on the pixel being processed is computed, as shown in box 817. As indicated by decision diamond 815, when this is done, the next step is to compute the effect of the speckle actual parameter on the point. As should be clear from the foregoing, the blur, jitter, and speckle parameters work together to transform the black and white scaled image into the gray scale image which is returned to step 713 for thresholding.

Figure 9:
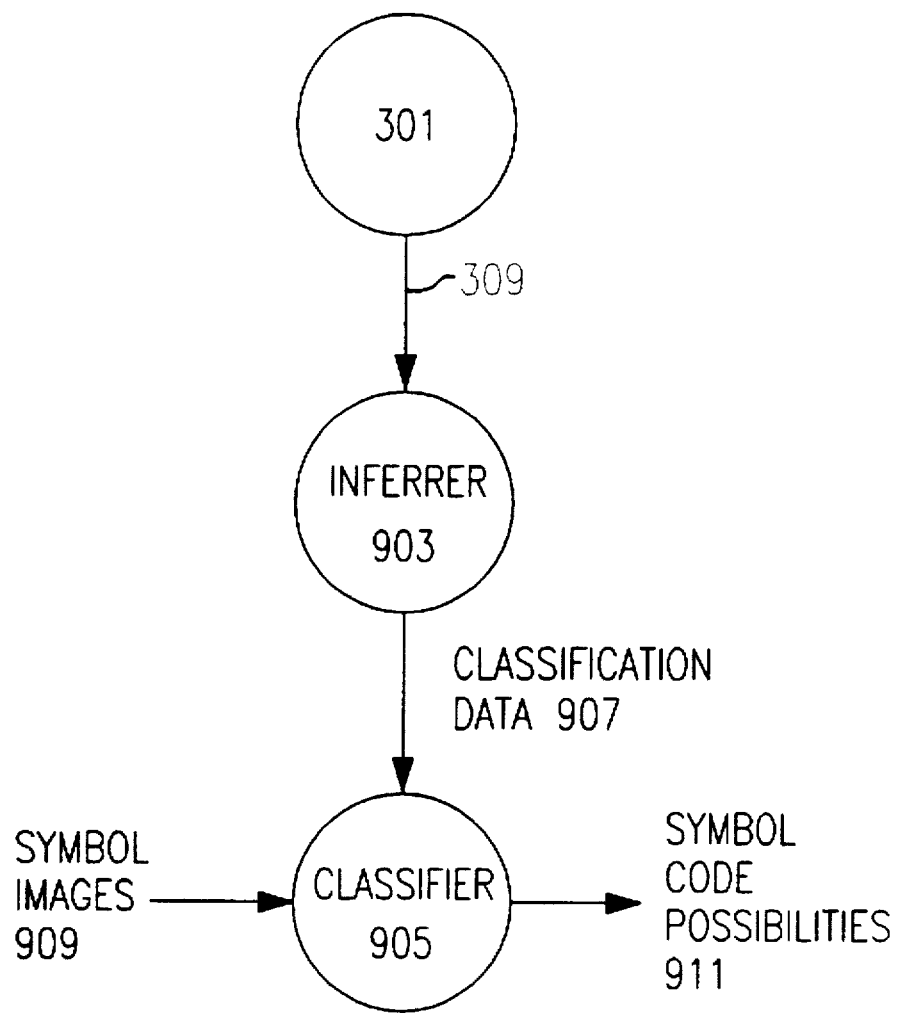
FIG. 9 is a block diagram of the use of image defect generator 301 with an inferrer to produce a classifier in an image recognition system.

Applications for Defect Generator 301: FIG. 9

Applications for image defect generator 301 include providing sets of images for inferring classifiers and character generation research. A block diagram of an example of the first type of application is shown in FIG. 9. Apparatus 901 employs an image defect generator 301 to provide a set of images to inferrer 903, which in turn provides classification data 907 based on the set of images to classifier 905. Classifier 905 is a component of an image recognition system which takes images of symbols 909 as input and produces a list of symbol code possibilities 911 as output. Each of the symbol code possibilities is a code in a system of digital codes used to represent symbols. One example of such a system of digital codes is the well-known ASCII set of codes for alphanumeric characters. The list of possibilities is provided to another component of the image recognition system which employs contextual information to choose among the possibilities on the list.

As is evident from the foregoing, the effectiveness and efficiency of the image recognition system is strongly dependent on the quality and number of symbol code possibilities produced by classifier 905. The image recognition system will be effective only if there is an extremely high probability that the code which actually corresponds to the input symbol image is on the list, and will be efficient only if the list of symbol code possibilities is short. An experiment has shown that defect generator 301 can be used with an inferrer 903 to generate a classifier 905 in which there is a high probability that the correct symbol code will be in the top 5 possibilities provided by classifier 905.

In the experiment, a classifier 905 was inferred using a method explained in Baird, H. S., "Feature Identification for Hybrid Structural/Statistical Pattern Classification," *Computer Vision, Graphics, and Image Processing*, vol. 42, 1988, pp. 318–333. The data base of images used to infer the classifier was generated by image defect generator 301 from the symbols in each of 39 fonts which corresponded to the 94 printable characters specified in the ASCII character code. Each character was specified in the bec representation. For each font, images were generated for 10 point sizes, ranging from 5 to 14 points. 25 images were generated for each of the 94 symbols in each of the 10 point sizes in each of the 39 fonts, leading to a total of 804,500 images. The images in the odd point sizes were used to infer the classifier; the images in the even point sizes were used to test it; ignoring confusions between characters such as 1,I or 0,O that appear to be inevitable when a classifier must work with more than one font, the success rates were 98.21% top choice and 99.45% within the top 5. The rates were even better if the smallest point size was dropped; in this case, the success rates were 99.19% top choice and 99.87% top five.

In an experiment using images represented by pixels as input, a classifier was inferred which classified images of characters in a Tibetan alphabet into a set of user-defined ASCII codes for the alphabet. The source of the images was a machine-printed Tibetan dictionary. Sample images of each symbol in each font style were selected, and these were provided as input to image defect generator 301. For each sample image, 25 images were generated in each of three sizes. These images were then used by inferrer 903 to infer classifier 905. Classifier 905 was then used with 61,124 symbols from the dictionary to translate the symbols into their ASCII codes. An accuracy of approximately 95% was achieved.

In another application, image defect generators 301 can be built which generate defective images 309 according to different models of the causes of image defects. By sharing an image defect generator 301 for a given model for image defects, researchers could generate unlimited numbers of images having the defects and distributions thereof specified by the model. The ability to generate large numbers of images is particularly important with neural-net pattern recognition systems, since present learning algorithms require a large number of presentations of training images to achieve convergence.

Conclusion

The foregoing Detailed Description has shown how defects in images may be classified, how an image defect generator 301 may be constructed which receives a model image as input and generates defective images as specified by defect parameters, and shown how the images generated by the image defect generator 301 may be used to infer classifiers which operate with a high degree of accuracy. While the Detailed Description has disclosed the best mode presently known of making and using image defect generator 301, alternatives are possible. For example, the image defect generator 301 disclosed herein generates defective images according to the classification of defects described herein; image defect generators may of course be constructed which generate defective images according to other classifications of defects. Such image defect generators would have different defect parameters and would modify the model image to produce the defective images in ways different from those disclosed herein. Further, descriptions of the model image other than the bec representation and the pixel representation employed herein may be employed in the image defect generator. Additionally, the manner in which the actual defect parameters are derived from the defect parameters provided in the command line may vary, and the manner in which image defect generator 301 modifies the model image in accordance with the actual defect parameters may vary. For example, as previously pointed out, in some embodiments, all modifications may be made on the bec representation; in others, all modifications may be made on the pixel representation.

The above being the case, the Detailed Description is to be understood as being in all respects as exemplary but not restrictive, and the scope of the invention is to be determined not from the Detailed Description, but rather from the appended claims as interpreted in light of the Detailed Description and the doctrine of equivalents.

What is claimed is:

1. A method of generating examples of defective pixel representations of symbols comprising the steps of:

receiving one or more defect class parameters selected by a user from a plurality thereof, each defect class parameter specifying a class of pixel representation defects;

receiving a set of one or more model symbols; and generating a set of defective pixel representations of the symbols from the set of model symbols in response to the defect class parameters, the defective pixel representations including pixel representation defects belonging to the defect classes specified by the defect class parameters.

2. The method set forth in claim 1 wherein:

the step of receiving one or more defect class parameters includes for a given defect class parameter the step of receiving a set of values which specify a range for the defects in the class specified by the given defect class parameter; and the step of generating the set of defective pixel representations generates defective pixel representations whose pixel representation defects in the defect class specified by the given defect class parameter are within the range specified by the received set of values.

3. The method set forth in claim 2 wherein:

the step of receiving one or more defect class parameters further includes for the given defect class parameter the step of receiving a further set of values which specify a distribution of the image defects in the defect class specified by the given defect class parameter within the received range; and the step of generating the set of defective pixel representations generates defective pixel representations whose pixel representation defects in the defect class specified by the given defect class parameter have the distribution specified by the received further set of values within the range specified by the received set of values.

4. The method set forth in claim 3 wherein:

the step of generating the set of defective pixel representations generates defective pixel representations whose pixel representation defects in the defect class specified by the given defect class parameter are randomized within the received set of values and the received set of further values.

5. The method set forth in claim 3 wherein:

one of the classes of pixel representation defects is blurring; and when the defect class parameters specify blurring, the step of generating a set of defective pixel representations includes the steps of:

making a circularly-symmetric Gaussian filter for a blurring defect within the received distribution and the received range; and applying the Gaussian filter to the model symbol.

6. The method set forth in claim 5 wherein:

the step of applying the Gaussian filter to the model symbol includes the steps of:

making a pixel representation of the model symbol; and applying the Gaussian filter to each pixel of the pixel representation.

7. The method set forth in any of claims 1, 2, 3, or 4, the method further comprising the step of:

receiving a number of images value from the user which specifies a number of defective pixel representations to be generated for each of the model symbols; and wherein the step of generating the set of defective pixel representations generates for each model symbol a first subset of the set of defective pixel representations which contains the number of defective pixel representations specified by the number of images value.

8. The method set forth in claim 7, the method further comprising the step of:

receiving a list of image sizes from the user, each image size indicating the size of one or more images in the set of defective pixel representations; and wherein the step of generating the set of defective pixel representations generates for each image size a second subset of the set of defective pixel representations which contains defective pixel representations of the size specified by the image size.

9. The method set forth in claim 1 wherein:

one or more of the plurality of defect class parameters specify classes of defects which result from improper placement of image source on a scanner.

10. The method set forth in claim 9 wherein:

the defect classes which result from improper placement of the image source on a scanner include skew, width, and height.

11. The method set forth in claim 1 wherein:

one or more of the classes of defect parameters specify classes of defects which result from faulty printing of a document.

12. The method set forth in claim 11 wherein:

the defect classes which result from faulty printing of the document include base height defects and kerning.

13. The method set forth in claim 1 wherein:

one or more classes of pixel representation defects are classes of image defects which result from the optics of a scanner.

14. The method set forth in claim 13 wherein:

the defect classes which result from the optics of the scanner include blurring, jitter, speckle, and thresholding defects.

15. Apparatus for generating examples of defective pixel representations of symbols comprising:

means for receiving a set of one or more defect class parameters selected by a user of the apparatus from a plurality thereof, each defect class parameter specifying a class of pixel representation defects;

a set of one or more model symbols; and means for making a set of defective pixel representations of the symbols from the set of model symbols in response to the defect class parameters, the defective pixel representations including pixel representation defects belonging to the classes specified by the defect class parameters.

16. The apparatus set forth in claim 15 wherein:

a given defect class parameter includes a set of values which specify a range for the defects in the defect class specified by the parameter; and the defective pixel representation maker responds to the specified range by making defective pixel representations whose pixel representation defects in the defect class specified by the given defect class parameter are within the specified range.

17. The apparatus set forth in claim 16 wherein:

the given defect class parameter further includes a further set of values which specify a distribution of the pixel representation defects in the defect class specified by the given defect class parameter within the specified range; and the defective pixel representation maker responds to the specified distribution by making defective pixel representations whose image defects in the defect class specified by the given defect class parameter have the specified distribution within the specified range.

18. The apparatus set forth in claim 17 wherein:

the defective pixel representation maker makes defective pixel representations whose pixel representation defects in the defect class specified by the given defect class parameter are randomized within the specified distribution specified by the further set of values and the range specified by the set of values.

19. The apparatus set forth in claim 17 wherein:

one of the classes of pixel representation defects is blurring; and when the defect class parameters specify blurring, the defective pixel representation maker makes a circularly-symmetric Gaussian filter for a blurring defect within the distribution specified by the further set of values and the range specified by the set of values and applies the Gaussian filter to the model symbol.

20. The apparatus set forth in claim 19 wherein:

the defective pixel representation maker applies the Gaussian filter to the model symbol by making a pixel representation of the model symbol and applying the Gaussian filter to each pixel of the pixel representation.

21. The apparatus set forth in any of claims 15, 16, 17, or 18 further comprising:

a number of images value received from the user which specifies a number of defective pixel representations to be generated for each of the model symbols; and the defective pixel representation maker makes for each model symbol a first subset of the set of defective pixel representations which contains the number of defective pixel representations specified by the number of images value.

22. The apparatus set forth in claim 21 further comprising:

a list of image sizes received from the user, each image size indicating the size of one or more pixel representations in the set of defective pixel representations; and the defective pixel representation maker makes for each image size a second subset of the set of defective pixel representations which contains defective pixel representations of the size specified by the image size.

23. The apparatus set forth in claim 15 wherein:

one or more of the plurality of defect class parameters specify classes of defects which result from improper placement of a source image on a scanner.

24. The apparatus set forth in claim 23 wherein:

the defect classes which result from improper placement of the source image on the scanner include skew, width, and height.

25. The apparatus set forth in claim 15 wherein:

one or more of the plurality of defect class parameters specify classes of defects which result from faulty printing of a document.

26. The apparatus set forth in claim 25 wherein:

the defect classes which result from faulty printing of the document include base height defects and kerning.

27. The apparatus set forth in claim 15 wherein:

one or more of the plurality of defect class parameters specify classes of defects which result from the optics of a scanner.

28. The apparatus set forth in claim 27 wherein:

the defect classes which result from the optics of the scanner include blurring, jitter, speckle, and thresholding defects.

29. A method of inferring a classifier of pixel representations of symbols for use in an optical image recognition system comprising the steps of:

receiving the set of model symbols;

receiving of one or more defect class parameters selected by a user from a plurality thereof, each defect class parameter specifying a class of pixel representation defects;

producing defective pixel representations which include pixel representation defects belonging to the defect classes specified by the defect class parameters; and employing the set of defective pixel representations to infer the classifier.

30. The method set forth in claim 29 wherein:

the model symbols have non-pixel representations.

31. The method set forth in claim 29 wherein:

the model symbols have pixel representations.

32. Apparatus for inferring a classifier of pixel representations of symbols for use in an optical image recognition system characterized in that:

the apparatus includes a defective pixel representation maker for making a set of defective pixel representations from a set of one or more model symbols, the defective pixel representation maker receiving one or more defect class parameters selected by a user of the apparatus from a plurality of the defect class parameters, each defect class parameter specifying a class of pixel representation defects and the defective pixel representation maker operating to generate the set of defective pixel representations from the set of model symbols in response to the defect class parameters, the defective pixel representations including pixel representation defects belonging to the classes specified by the defect class parameters; and the set of defective pixel representations are employed to infer the classifier.

33. The apparatus set forth in claim 32 wherein:

the model symbols have non-pixel representations.

34. The apparatus set forth in claim 32 wherein:

the model symbols have pixel representations.

* * * * *